United States Patent
Samata et al.

(10) Patent No.: US 6,766,275 B2
(45) Date of Patent: Jul. 20, 2004

(54) METHOD FOR DIAGNOSING LIFE OF MANUFACTURING EQUIPMENT USING ROTARY MACHINE

(75) Inventors: Shuichi Samata, Yokohama (JP); Yukihiro Ushiku, Yokohama (JP); Ken Ishii, Kawasaki (JP); Takashi Nakao, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 4 days.

(21) Appl. No.: 10/228,111

(22) Filed: Aug. 27, 2002

(65) Prior Publication Data

US 2003/0154052 A1 Aug. 14, 2003

(30) Foreign Application Priority Data

Aug. 31, 2001 (JP) ..................................... P2001-263548

(51) Int. Cl.[7] .......................... G06F 19/00; G06F 17/40
(52) U.S. Cl. .......................... 702/184; 702/183; 702/56; 702/34; 702/35; 700/121; 700/108
(58) Field of Search ................................. 702/184, 183, 702/185, 34, 35, 36, 182; 700/30, 32, 108, 121, 29, 123, 174, 175, 177, 266, 283

(56) References Cited

U.S. PATENT DOCUMENTS

| | | | | |
|---|---|---|---|---|
| 5,146,417 A | * | 9/1992 | Watson ......................... | 702/85 |
| 5,210,704 A | * | 5/1993 | Husseiny ...................... | 702/34 |
| 5,406,502 A | * | 4/1995 | Haramaty et al. ........... | 702/183 |
| 5,501,105 A | * | 3/1996 | Hernandez et al. ............ | 73/660 |
| 5,586,066 A | * | 12/1996 | White et al. ................. | 702/181 |
| 5,610,339 A | * | 3/1997 | Haseley et al. ................ | 73/660 |
| 5,710,723 A | * | 1/1998 | Hoth et al. ................... | 702/181 |
| 5,870,699 A | * | 2/1999 | Canada et al. ............... | 702/190 |
| 5,987,399 A | * | 11/1999 | Wegerich et al. ............ | 702/183 |
| 6,181,975 B1 | * | 1/2001 | Gross et al. ................... | 700/29 |
| 6,199,018 B1 | * | 3/2001 | Quist et al. .................... | 702/34 |
| 6,202,038 B1 | * | 3/2001 | Wegerich et al. ............ | 702/183 |
| 6,208,953 B1 | * | 3/2001 | Milek et al. .................... | 703/7 |
| 6,226,597 B1 | * | 5/2001 | Eastman et al. ............... | 702/34 |
| 6,240,372 B1 | * | 5/2001 | Gross et al. ................... | 702/71 |
| 6,260,004 B1 | * | 7/2001 | Hays et al. .................. | 702/183 |
| 6,297,742 B1 | * | 10/2001 | Canada et al. .............. | 340/635 |
| 6,392,584 B1 | * | 5/2002 | Eklund ........................ | 341/183 |
| 6,434,512 B1 | * | 8/2002 | Discenzo ..................... | 702/184 |
| 6,438,440 B1 | * | 8/2002 | Hayashi ...................... | 700/121 |

(List continued on next page.)

FOREIGN PATENT DOCUMENTS

JP      2000-259222      9/2000

OTHER PUBLICATIONS

Hayashi et al., "A New Manufacturing Control System using Mahalanobis Distance for Maximising Productivity", IEEE, 2001.*

(List continued on next page.)

Primary Examiner—Patrick Assouad
(74) Attorney, Agent, or Firm—Finnegan, Henderson, Farabow, Garrett & Dunner, L.L.P.

(57) ABSTRACT

A method for diagnosing life of manufacturing equipment having a rotary machine, includes: measuring reference time series data for characteristics before deterioration of the manufacturing equipment occurs; finding a reference auto covariance function based on the reference time series data; extracting a reference variation caused by variations of the process condition and power supply from the reference auto covariance function, and calculating a cycle of the reference variation; measuring diagnostic time series data for the characteristics in a sequence to be measured of the manufacturing equipment; finding a diagnostic auto covariance function based on the diagnostic time series data; and determining the life of the manufacturing equipment from the diagnostic auto covariance function using a component with a cycle shorter than a cycle of the reference variation.

23 Claims, 7 Drawing Sheets

U.S. PATENT DOCUMENTS

| | | | |
|---|---|---|---|
| 6,526,831 B2 * | 3/2003 | Ben-Romdhane | 73/660 |
| 6,665,576 B2 * | 12/2003 | Hayashi | 700/121 |
| 2002/0083773 A1 * | 7/2002 | Ben-Romdhane | 73/660 |
| 2002/0193891 A1 * | 12/2002 | Ushiku | 700/21 |
| 2003/0009311 A1 * | 1/2003 | Ushiku et al. | 702/184 |
| 2003/0143747 A1 * | 7/2003 | Bondestam et al. | 436/34 |
| 2003/0149547 A1 * | 8/2003 | Nakao et al. | 702/183 |
| 2003/0158705 A1 * | 8/2003 | Ishii et al. | 702/183 |

OTHER PUBLICATIONS

Chang et al., "Continuous Equipment Diagnosis Using Evidence Integration: A LPCVD Application", IEEE, 1991.*

IEE Proc.–Sci. Meas. Technol., vol. 146, No. 6, (Nov. 1999), pp. 270–276, S. Konishi et al., "Diagnostic system to determine the in–service life of dry vacuum pumps".

* cited by examiner

DATA INTERVAL $\tau$ (min)

DATA INTERVAL $\tau$ (min)

METHOD FOR DIAGNOSING LIFE OF MANUFACTURING EQUIPMENT USING ROTARY MACHINE

CROSS REFERENCE TO RELATED APPLICATIONS

This application is based upon and claims the benefit of priority from prior Japanese Patent Application P2001-263548 filed on Aug. 31, 2001; the entire contents of which are incorporated herein by reference.

BACKGROUND OF THE INVENTION

1. Field of the Invention

The present invention relates to a diagnostic method, which predicts life of manufacturing equipment that uses a rotary machine. In particular it is related to a diagnostic method, which predicts the life of a dry pump used in semiconductor manufacturing equipment, such as low-pressure chemical vapor deposition (LPCVD) equipment or dry etching equipment.

2. Description of the Related Art

Failure diagnosis has become important to ensure efficient semiconductor device manufacturing. In recent years, especially as the trend towards many item/small volume production of system LSI grows, an efficient yet highly adaptable semiconductor device manufacturing method has become necessary. It is possible to use a small-scale production line for efficient production of semiconductors. However, if the large-scale production line is merely shortened, investment efficiency may be reduced because of problems such as a drop in manufacturing equipment capacity utilization. To rectify this situation, there is a method where a plurality of manufacturing processes are performed by one piece of manufacturing equipment. For example, in LPCVD equipment using a dry pump for the evacuation system, reactive gases and reaction products differ and formation situations for the reaction products within the dry pump differ depending on the type of manufacturing processes. Therefore, the manufacturing process affects the life of the dry pump.

If the dry pump should have a shutdown during a specific manufacturing process, then the lot being processed becomes defective. Moreover, excessive maintenance of the manufacturing equipment may become necessary due to microscopic dust caused by residual reactive gases within the manufacturing equipment. Implementation of such excessive maintenance causes the manufacturing efficiency of the semiconductor device to drop dramatically. If regular maintenance is scheduled with a margin of safety in order to prevent such sudden shutdowns during the manufacturing process, the frequency of maintenance work on the dry pump may become astronomical. Not only does this increase maintenance costs, but also the decrease in capacity utilization of the semiconductor manufacturing equipment becomes remarkable due to changing the dry pump, causing the manufacturing efficiency of the semiconductor device to sharply decline. In order to use of semiconductor manufacturing equipment in common for a plurality of processes, as is necessary for an efficient small-scale production line, it is desirable to accurately diagnose vacuum pump life and to operate the dry pump without having any waste in terms of time.

Previously, some methods of diagnosing dry pump life have been proposed. For example, a method using the Mahalanobis distance (MD) is a highly sensitive diagnosis of failure occurrences. With the method of diagnosing life according to the MD, data for characteristics in which homogeneity may be promised is gathered to form the recognition space by only utilizing data from the same conditions. In other words, when characteristics are measured under normal conditions, the characteristics are expected to be relatively homogeneous. In the method of diagnosing life according to the MD, such normal condition characteristics, in which homogeneity may be promised, are gathered to form the "Mahalanobis space (reference space)", which is a space for determining life. Since a set of data of characteristics for normal conditions forms a space to become a reference for measurement and has a certain correlation, the Mahalanobis space is represented by the inverse matrix of a correlation matrix derived from the set of characteristics data. The MD is a measure indicating the degree of abnormality in the characteristics data to be measured, that is, it indicates how far the measured characteristics data deviate from the characteristics data under normal conditions, and this is forms the reference for measurement. The MD takes a value between zero and infinity. If the value is small, it may be determined as a group of normal data; whereas if the value is large, the probability of abnormality is high, and therefore it is determined that life may be short.

The key to a life diagnosis method based on the MD lies in determining the characteristics and forming the Mahalanobis space (reference space) representing normal conditions. With the conventionally proposed method of diagnosing life according to the MD, a reference space is formed by utilizing data only immediately after doing maintenance. Therefore, the effects of variation during the semiconductor manufacturing process, such as pressure variation or variation of the amount of gas flow, and power supply may not be eliminated, and thus it is difficult to diagnose with accuracy.

In addition, with the dry pump, there is a problem of disparity between equipment where characteristics such as motor current vary according to device. Such disparity between equipment has been an obstacle to highly accurate diagnosis.

As described above, with the conventional dry pump failure diagnosis method, there are problems such as the fact that highly accurate diagnosis is difficult because of effects such as variation in process conditions, power supply variation, and the disparity between equipment relating to semiconductor manufacturing.

SUMMARY OF THE INVENTION

According to a first aspect of the present invention, a method for diagnosing life of manufacturing equipment having a rotary machine, includes: measuring reference time series data representing characteristics in a state before deterioration of the manufacturing equipment occurs; finding a reference auto covariance function based on the reference time series data; extracting a reference variation caused by variations of the process condition and power supply from the reference auto covariance function, and calculating a cycle of the reference variation; measuring diagnostic time series data representing the characteristics in a sequence to be measured of the manufacturing equipment; finding a diagnostic auto covariance function based on the diagnostic time series data; and determining the life of the manufacturing equipment from the diagnostic auto covariance function using a component with a cycle shorter than a cycle of the reference variation.

According to a second aspect of the present invention, a method for diagnosing life of manufacturing equipment having a rotary machine, includes: measuring reference time series data before starting measurement of diagnostic time series data for characteristics of the manufacturing equipment; setting a Mahalanobis space from the reference time series data; measuring the diagnostic time series data; calculating a time variation of a Mahalanobis distance of the diagnostic time series data by using the diagnostic time series data and the Mahalanobis space; setting a new Mahalanobis space from the diagnostic time series data when the Mahalanobis distance reaches a threshold value; and determining the life of the manufacturing equipment by comparing a new Mahalanobis distance corresponding to the new Mahalanobis space with the threshold value.

DETAILED DESCRIPTION OF THE INVENTION

Figure 1:
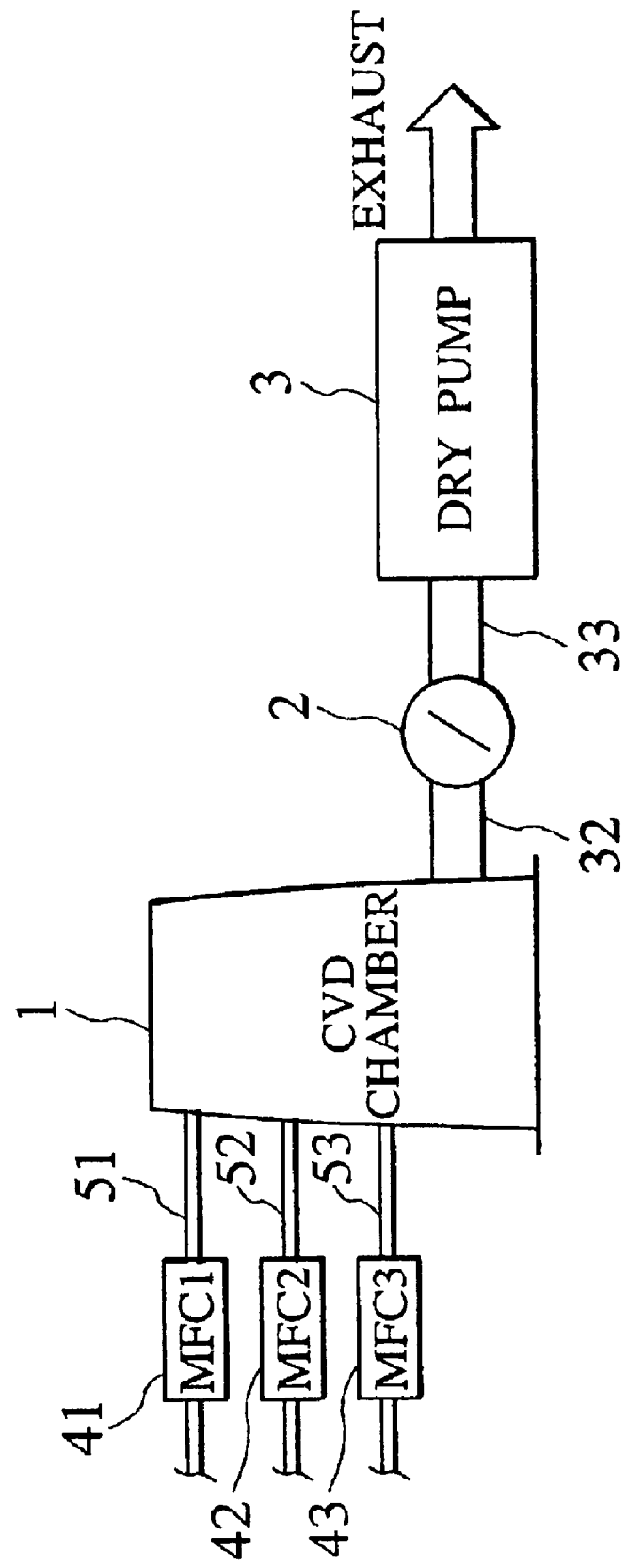
FIG. 1 is a schematic diagram of LPCVD equipment shown as an example of semiconductor manufacturing equipment according to an embodiment of the present invention.

Various embodiments of the present invention are described forthwith with reference to the accompanying drawings. It is to be noted that the same or similar reference numerals are applied to the same or similar parts and elements throughout the drawings, and the description of the same or similar parts and elements will be omitted or simplified.

Next, the first through third embodiments are described with reference to the drawings. In the first through third embodiments, LPCVD equipment is illustrated as an example of semiconductor manufacturing equipment as the target of life diagnosis. In particular, the case of diagnosing life of a dry pump used in this LPCVD equipment is described.

To begin with, before entering into the description of the first through third embodiments of the present invention, an outline of the LPCVD equipment as the target of life diagnosis is described using FIG. 1. In the LPCVD equipment shown in FIG. 1, gas pipings 51, 52, and 53 are connected to a CVD chamber 1. These gas pipings 51, 52, and 53 are connected to mass flow controllers 41, 42, and 43, respectively, which control various source gases and carrier gas introduced into the CVD chamber 1. More specifically, source gases and the like having their flow controlled by mass flow controllers 41, 42, and 43 are introduced into the CVD chamber 1 under fixed low-pressure conditions via gas pipings 51, 52, and 53. The CVD chamber 1 has an air-tight structure capable of shutting out outside air and maintaining an atmosphere. In order to evacuate the CVD chamber 1 using a dry pump 3, vacuum piping 32 is connected to the exhaust side of the CVD chamber 1, and a gate valve 2 is connected to the exhaust side of this vacuum piping 32. Another vacuum piping 33 is further connected to the exhaust side of the gate valve 2. The intake side of the dry pump 3 is connected to the exhaust side of the vacuum piping 33. The gate valve 2 may be a valve for either separating the CVD chamber 1 and dry pump 3 or for adjusting exhaust conductance, as circumstances require. In addition, the dry pump 3 is used for evacuating non-reactant source gases and reaction products introduced into the CVD chamber 1.

For example, in the case of depositing a silicon nitride film ($Si_3N_4$ film) using the LPCVD equipment shown in FIG. 1, dichlorosilane ($SiH_2Cl_2$) gas and ammonia ($NH_3$) gas are respectively introduced via the mass flow controllers 41 and 42 into the CVD chamber 1 under low-pressure conditions. Inside the CVD chamber 1, a silicon (Si) substrate is heated to approximately 800° C., and through the chemical reaction of the dichlorosilane gas and ammonia gas, a silicon nitride film is deposited upon the silicon substrate. In addition to generating the silicon nitride film, this reaction produces the reaction by-products of ammonium chloride ($NH_4Cl$) gas and hydrogen ($H_2$) gas. Since hydrogen is a gaseous body, it can be evacuated through the dry pump 3. On the other hand, since the temperature of the silicon substrate within the reactor is approximately 800° C. and it is under low-pressure of approximately several 100 Pa or less at the time of formation, the ammonium chloride is also a gas. While it is omitted from the drawings, LPCVD equipment typically has a trap disposed between chamber 1 and dry pump 3 for collecting solid reaction by-product. With this trap, it is impossible to completely collect the reaction by-product under low-pressure conditions. Reaction by-product that is not collected reaches the dry pump 3. Pressure in the dry pump 3 increases from approximately 0.1 Pa to normal atmospheric pressure due to the compression of the gas. The reaction by-product is in a gas phase under low-pressure conditions, and begins to solidify in accordance with the sublimation curve of the phase diagram as pressure increases. Within the pump, since the pressure changes from several 100 Pa of pressure to normal atmospheric pressure by repeating compression of the gas, the gaseous reaction by-product within the exhaust gas begins to solidify in the dry pump 3 as the pressure increases. If solidification begins in the piping of the dry pump 3, exhaust conductance drops, and pressure further increases in the solidifying/adsorbing portions of the reaction by-product. As a result, the temperature of the dry pump 3 begins to rise, resulting in the occurrence of failure of the dry pump 3. In the following descriptions of the first through third embodiments, an example of failure of the dry pump 3 used in such LPCVD equipment and a method of diagnosing life is described.

(First Embodiment)

In a method of diagnosing manufacturing equipment life according to a first embodiment of the present invention, time series data for characteristics such as motor current, motor power, inner pressure of the pump, vibration, and gas temperature obtained from the semiconductor manufacturing equipment are analyzed, and stochastic techniques are used to predict future failure of semiconductor manufacturing equipment. For example, if a relationship such as "if dry pump motor current is high at a certain point in time, motor current increases even after a predetermined lag width τ (data interval)" can be found, it would be useful in dry pump failure prediction.

To begin with, in order to analyze time series data for the characteristics obtained from the semiconductor manufacturing equipment, an assumption of constancy must be made. Simply put, constancy indicates that time series data at each time is realized by the same stochastic process, or that the statistical properties of a stochastic process do not change over time. To have this constancy, conditions must be met where an expected value $E[x(t)]=\mu$ remains unchanged over time and an expected value $E[x(t)^2]=\mu^2$ remains unchanged over time. In short, the variance of $x(t)$ over time should not change, and further, the expected value $E[x(t)x(\tau)]$ for an arbitrary t and τ, is dependent on only the function of t−τ, or in other words the expected value $E[x(t)x(\tau)]$ is dependent solely on the difference in time. Namely, the expected value $E[x(t)x(t+\tau)]$ becomes a function of the lag width τ, and the expected value $E[x(t)]=\mu$ becomes fixed.

Therefore, the degree to which the variable $x(t)$ and the variable $x(t+\tau)$ after the lag width τ operate together, or the covariance of $x(t)$ and $x(t+\tau)$:

$$cov(x(t), x(t+\tau))=E[(x(t)-\mu)(x(t+\tau)-\mu)] \quad (1)$$

are functions only of the lag width (data interval) τ. This is because $$E[(x(t)-\mu)(x(t+\tau)-\mu)]=E[x(t)x(t+\tau)]-\mu^2. \quad (2)$$

This is called the auto covariance function $C(\tau)$, and is defined as:

$$C(\tau)=E[(x(t)-\mu)(x(t+\tau)-\mu)]. \quad (3)$$

Moreover, the autocorrelation function $\rho_{xx}(\tau)$ is defined as:

$$\rho_{xx}(\tau)=C(\tau)/C(0). \quad (4)$$

$C(\tau)$ represents the strength of the connection between the data separated by the lag width τ.

In other words, when this amount is positively large, the variable $x(t)$ and the variable $x(t+\tau)$ after the lag width τ tend to behave in the same manner. On the other hand, if it is negatively large, the variable $x(t)$ and the variable $x(t+\tau)$ tend to behave in opposite manners. Also, if this amount is 0, the variable $x(t)$ and the variable $x(t+\tau)$ behave independently of each other.

Further, by dividing $C(\tau)$ by $C(0)$, which is the normal variance, the value of $\rho_{xx}(\tau)$ can be standardized to be:

$$-1 \leq \rho_{xx}(\tau) \leq 1. \quad (5)$$

Since the normal variance of $C(0)$ represents the strength of the relationship with itself, and not a correlation stronger than itself, $$|C(\tau)| \leq |C(0)|. \quad (6)$$

Eventually, as the auto correlation function $\rho_{xx}(\tau)$ approaches 1, it can be determined that there is a strong relationship between the variable $x(t)$ and the variable $x(t+\tau)$, allowing the life of the semiconductor manufacturing equipment to be predicted.

Figure 2:
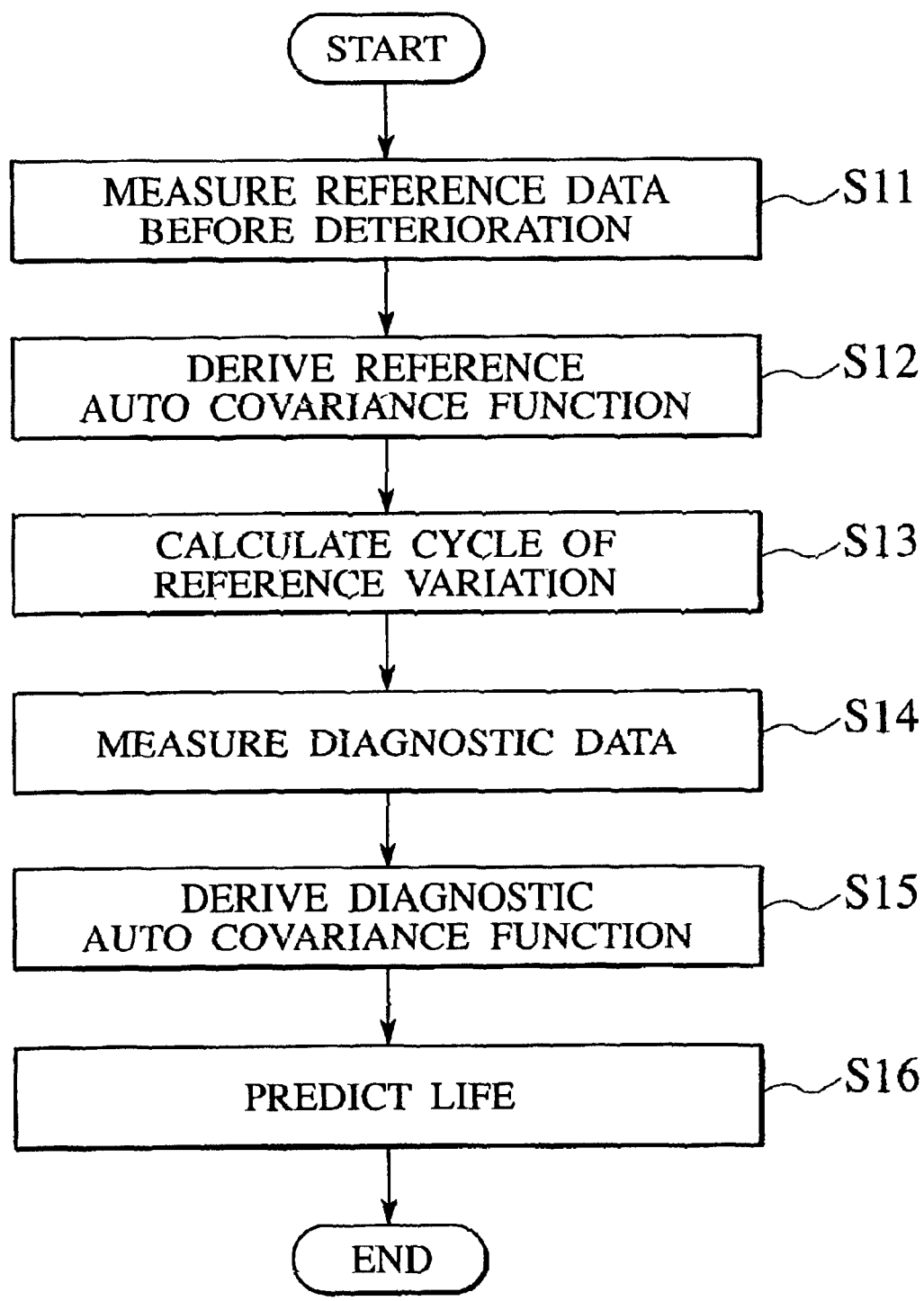
FIG. 2 is a flowchart for describing a method of diagnosing manufacturing equipment life according to a first embodiment of the present invention.

The method of diagnosing manufacturing equipment life according to the first embodiment of the present invention is performed in accordance with the procedure shown in FIG. 2:

(a) To begin with, in Step S11, time series data representing characteristics before deterioration of the dry pump occurs is measured as "reference time series data". In other words, immediately-after-maintenance is selected as the "time no deterioration occurs" and the immediately-after-maintenance one-day motor current reference time series data is measured. Reference time series data is measured at one-minute intervals.

(b) Next, in Step S12, an auto covariance function $C(\tau)$ is obtained based on the reference time series data and is regarded as the "reference auto covariance function $C(\tau)$". In other words, the reference auto covariance function $C(\tau)$ is obtained for the data during the deposition sequence depositing the $Si_3N_4$ thin film, based on the immediately-after-maintenance one-day motor current reference time series data wherein there is no deterioration.

Figure 3:
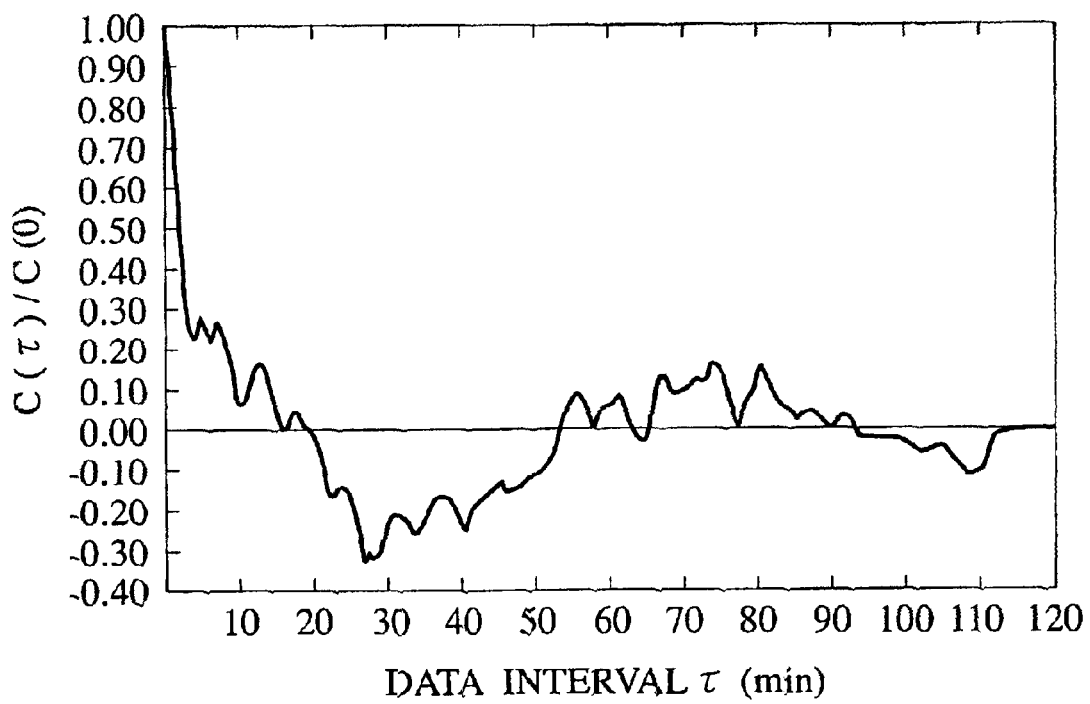
FIG. 3 is a graph showing an example of the auto covariance function of after-maintenance motor current of a dry pump.

(c) Next, in Step S13, the variable component, which is regarded as a cause of process condition variation or power supply variations derived from the reference auto covariance function $C(\tau)$, which is obtained based on the reference time series data through which the cycle of the variations are calculated. FIG. 3 shows an example of the immediately-after-maintenance motor current reference auto covariance function $C(\tau)$ for the dry pump. The vertical axis in FIG. 3 is the auto correlation function $\rho_{xx}(\tau)$ normalized by $C(0)$ (corresponding to the normal variance). The horizontal axis represents the data interval τ for the immediately-after-maintenance motor current measurement. In this case, the unit is minutes. With the data in FIG. 3, the variable component, which is regarded as a cause of process condition variation or power supply variation, can be seen from the reference auto covariance function $C(\tau)$ as occurring at ten-minute intervals or longer.

(d) Then, in Step S14, diagnostic time series data for the characteristics is measured in the sequence with which the semiconductor manufacturing equipment is to be measured. In other words, the time series data for the motor current in the deposition sequence is regarded as "diagnostic time series data", and this diagnostic time series data is measured.

(e) Thereafter, in Step S15, a "diagnostic auto covariance function $C(\tau)$" is found based on this diagnostic time series data.

Figure 4:
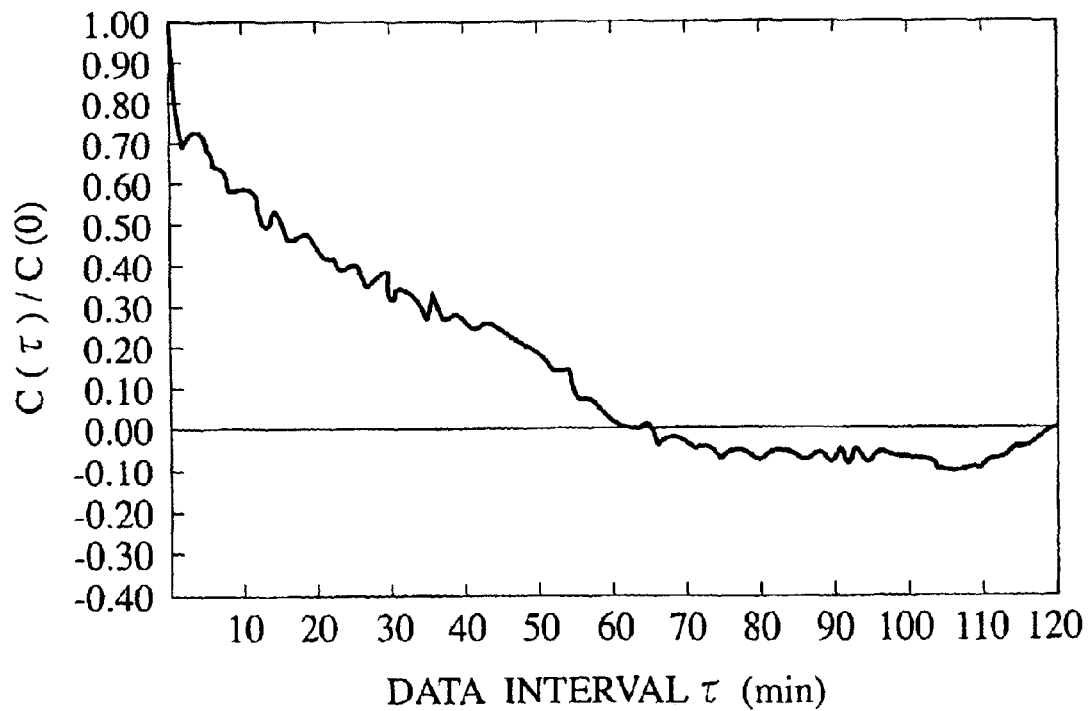
FIG. 4 is a graph showing an example of the auto covariance function in a case showing a failure indication.
Figure 5:
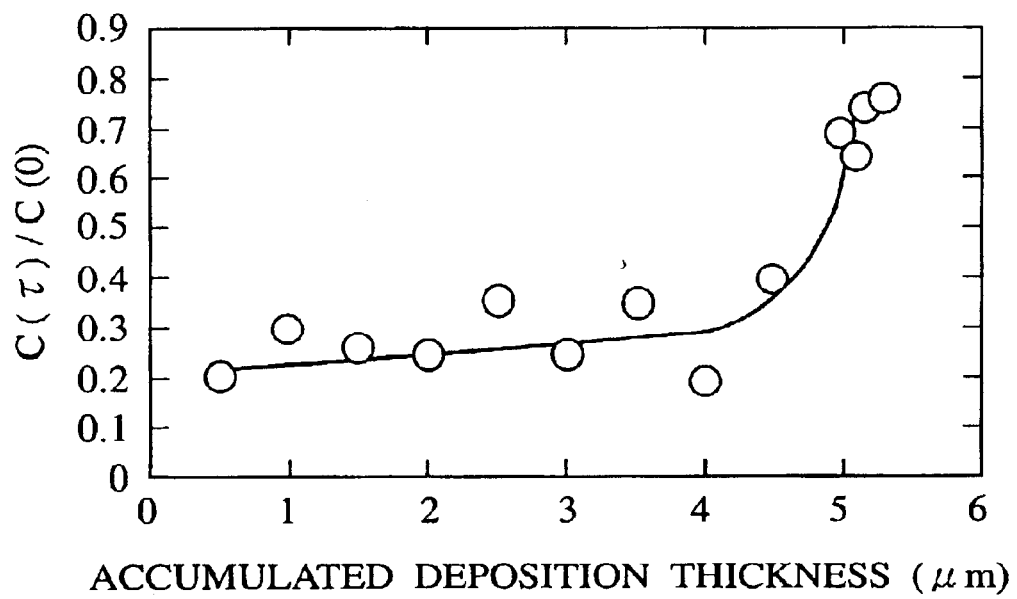
FIG. 5 is a graph showing the accumulated thickness dependency of the auto covariance function.

(f) In Step S16, the life of the semiconductor manufacturing equipment is determined from the diagnostic auto covariance function by using a component with a cycle shorter than the cycle of reference variation. In other words, behavior of the diagnostic auto covariance function $C(\tau)$ is measured by using a component with a cycle of ten-minute intervals or shorter. FIG. 4 shows variation of the auto correlation function $\rho_{xx}(\tau)$ in a case indicating the prediction of a failure. With the measurement result, when accumulated deposition thickness is approximately 5 μm, a remarkable increase is seen at portion with ten-minute intervals or less, thus it is confirmed that the pump may fail at any minute, that is, failure indication may be confirmed. In fact, the accumulated deposition thickness dependency of the auto correlation function $\rho_{xx}(\tau)$ in the case where the data interval τ is five minutes is shown in FIG. 5. It can be understood that the accumulated deposition thickness of the auto correlation function $\rho_{xx}(\tau)$ shown in the vertical axis sharply increases when the accumulated deposition thickness is approximately 5 μm. As the deposition process further continues, the dry pump halts when the accumulated deposition thickness reaches 5.5 μm.

Figure 6:
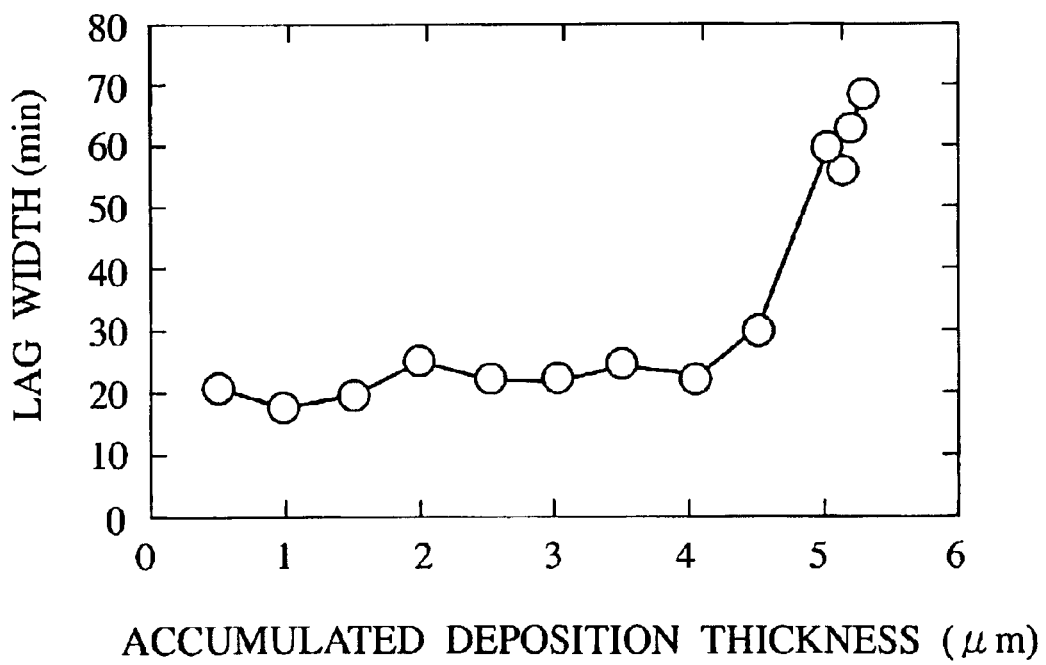
FIG. 6 is a graph showing the accumulated thickness dependency of lag width.

FIG. 6 shows the accumulated deposition thickness dependency of the data interval τ (lag width) where the auto correlation function $\rho_{xx}(\tau)$ first becomes 0 in FIG. 3. Similar to the auto correlation function $\rho_{xx}(\tau)$ in the case where the data interval τ is close to 0 shown in FIG. 5, variation of the lag width τ sharply increases when the accumulated deposition thickness is approximately 5.5 μm, thus it is understood that a failure indication can be detected, if we define an appropriate threshold value.

In the method of diagnosing manufacturing equipment life according to the first embodiment of the present invention, the "threshold value", which determines the failure indication, can be obtained empirically for actual application. For example, if a case where deviation from the average value under normal conditions is found to be one to three or more times greater than the standard deviation it may be regarded as a failure indication, and the failure indication may be accurately detected. In the first embodiment, it can be understood that the failure indication may be detected at approximately one-tenth the thickness of accumulated deposition thickness before dry pump failure. Since each parameter increases in consistent increments after the auto covariance function C(τ) detects the failure indication, it is possible to set the threshold value for exchanging the dry pump at a value immediately before it halts. Therefore, it is possible to make device manufacturing efficient. Converting the threshold level to an accumulated thickness, the prediction of the dry pump shut down is possible up until 0.1 μm. Typically, since the $Si_3N_4$ deposition thickness formed by the LPCVD process is approximately 20 nm to 200 nm, it is possible to determine whether the dry pump halts or not during the next deposition process according to the method of diagnosing manufacturing equipment life according to the first embodiment.

In the first embodiment, an example is given of a case where motor current is analyzed by the auto covariance function C(τ). The dry pump may employ a multi-stage configuration comprising a backing pump and a plurality of main pumps in order to increase evacuation speed. For example, a vacuum evacuation system may be set up with the multi-stage configuration in which the backing pump, such as a mechanical booster pump, the first stage main pump, the second stage main pump, the third stage main pump, the fourth stage main pump, and the fifth stage main pump are connected in series with each other. The first to fifth stage main pumps may be dry pumps, respectively. Additionally, there is a case where, for example, a gas cooler may be interposed between the pre-stage of the main pump and the post-stage of the main pump. In the case of a vacuum evacuation system with such a multi-stage configuration, a pump at the location where product generation becomes remarkable within the system may be made the target. More specifically, attention should be paid to the pump at points where variation increases as the multi-stage vacuum evacuation system operates. In addition, besides current, similar results may be obtained for characteristics such as power, pressure, vibration, and gas temperature. Furthermore, the measurement interval for the time series data may be determined in accordance with process conditions. With typical LPCVD processes accompanying semiconductor device manufacturing, appropriate time series data measurement intervals may range from 0.5 seconds to 10 minutes.

(Second Embodiment)

A manufacturing equipment life diagnosis method according to the second embodiment of the present invention is described herein as an example that uses frequency analysis for dry pump failure diagnosis. More specifically, instead of the auto covariance function C(τ) for the motor current, which is used for failure diagnosis in the dry pump of the first embodiment, the frequency distribution of casing vibration of the dry pump is analyzed.

Figure 7:
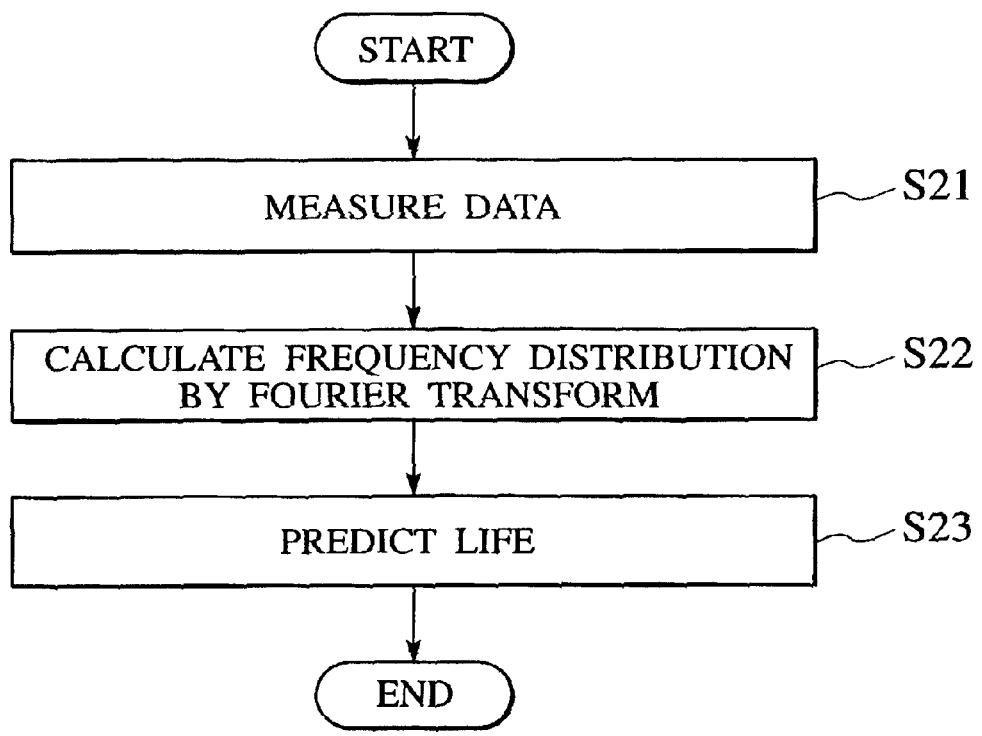
FIG. 7 is a flowchart showing a method of diagnosing manufacturing equipment life according to a second embodiment of the present invention.

The method of manufacturing equipment life diagnosis according to the second embodiment of the present invention is performed in accordance with the procedure shown in FIG. 7:

(a) To begin with, in Step S21, time series data for characteristics (vibration) of the dry pump is measured for semiconductor manufacturing equipment. The vibration measurement is performed by measuring the acceleration of the casing every 10 seconds using the acceleration sensor. Each measurement is performed over a one-second length of time at 0.5-msec intervals.

(b) In Step S22, after being measured, the casing acceleration (time series data) measured by the acceleration sensor is subjected to a Fourier transformation, and the frequency distribution is found.

(c) In Step S23, attention is then paid to the predetermined frequency component of the frequency distribution, and the manufacturing equipment (dry pump) life is determined by the change in characteristics occurring in this predetermined frequency component. The motor of the dry pump according to the second embodiment rotates at 3000 rpm, and the rotor is made to be three-bladed. In the second embodiment, behavior is observed for the respective frequency distributions of 50 Hz, 150 Hz, 300 Hz, and 450 Hz, and the high frequency portions at or above 500 Hz. The film growing process during LPCVD includes various sequences such as pressure reduction, temperature increase, deposition, purging, return to normal pressure, and standby, however in the second embodiment, behavior is observed at the deposition sequence, where the greatest effect of dry pump failure is felt.

Figure 8:
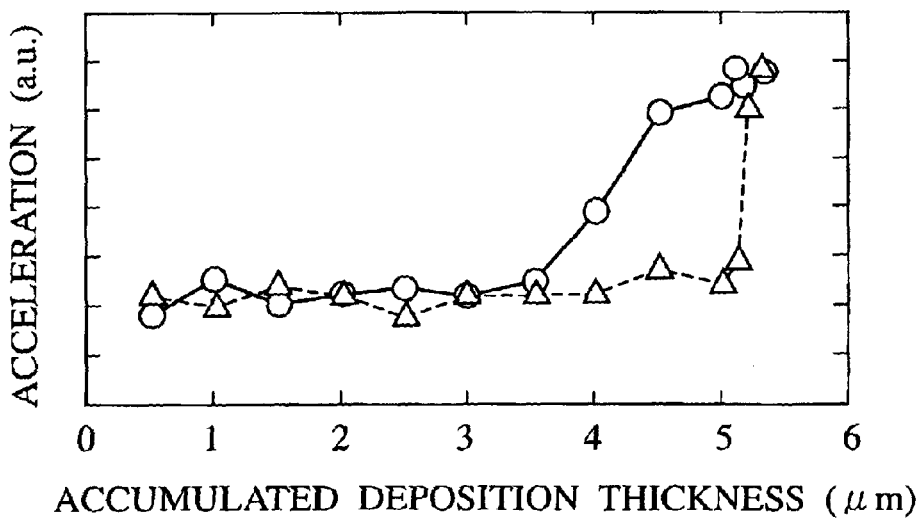
FIG. 8 is a graph showing the accumulated deposition thickness dependency of acceleration at a specified frequency.

FIG. 8 shows the accumulated deposition thickness dependency of acceleration at a predetermined frequency. As shown in FIG. 8, when the accumulated deposition thickness is approximately 4 μm, an increase in acceleration in the 150 Hz to 450 Hz band (shown with a circle) is seen and increases in the higher frequency portion (shown with a triangle) at or above 800 Hz can be seen when the accumulated deposition thickness reaches 5.2 μm. The dry pump then halts when the accumulated deposition thickness is 5.5 μm. In this manner, it is understood that failure indication can also be detected by the acceleration at a predetermined frequency, if we define an appropriate threshold value.

In diagnosing the manufacturing equipment life according to the second embodiment of the present invention, the "threshold value" for determining the time of the failure can be set empirically. For example, if failure indication is set as being at instances where deviation from the average value of between one and three times the standard deviation under normal conditions, failure indication may be detected accurately. In the second embodiment, failure indication may be determined at approximately one-tenth the thickness of the accumulated deposition thickness before the dry pump halts. Since the acceleration at a predetermined frequency shows a monotonic increase for each parameter once a failure indication is detected, it is possible to define the threshold value for dry pump replacement to be at immediately before failure, which makes it possible to improve the semiconductor device manufacturing efficiency. Converting the threshold value to an accumulated thickness, it is possible to define the threshold value to 0.1 µm just before the point of dry pump failure.

In the second embodiment, the measuring point of vibration is used for casing, however, any measuring point such as a roller bearing may be used where the products attach to a rotor, and the off-balance condition of the rotor may be sensitively detected. Although the interval for measuring the time series data may be determined in accordance with the process conditions, with a typical LPCVD process accompanying semiconductor device manufacturing, appropriate time series data measurement intervals may range from 0.5 seconds to 10 minutes.

(Third Embodiment)

A method of manufacturing equipment life diagnosis according to a third embodiment of the present invention is described herein as an example where the MD is used for dry pump failure diagnosis. In other words, in the third embodiment, instead of measuring the behavior of the auto covariance function $C(\tau)$ of the motor current in the first embodiment, the MD may be used based on characteristics such as motor current, the inner pressure of a pump, and vibration on the outside wall of the pump.

Figure 9:
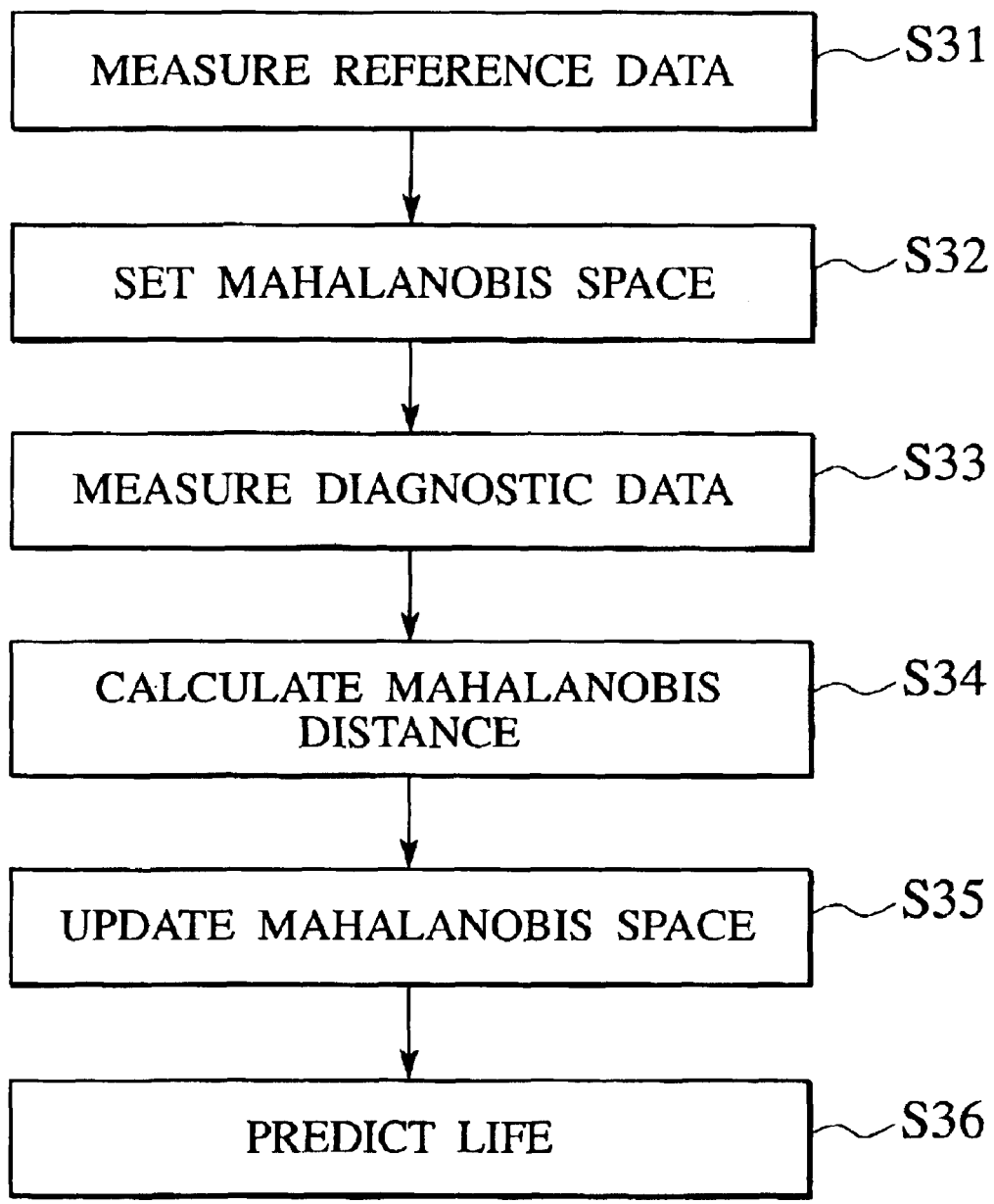
FIG. 9 is a flowchart showing a method of diagnosing manufacturing equipment life according to the third embodiment of the present invention.

The method of diagnosing manufacturing equipment life according to the third embodiment of the present invention is performed in accordance with the procedure shown in FIG. 9:

(a) To begin with, in Step S31, at a predetermined time before the time where measurement starts for the diagnostic time series data of the semiconductor manufacturing equipment characteristics, reference time series data is measured for characteristics corresponding to the same process conditions as the targeted diagnosis. The way in which the reference space (Mahalanobis space) is found is key to using the MD as manufacturing equipment life diagnosis method. In the third embodiment of the present invention, the characteristics data uses only the LPCVD process deposition sequence as the "same process conditions as diagnosis". More specifically, to eliminate the effects of variation in the process conditions, for instance, characteristics data for the proceeding three days is used as "reference time series data". Here, characteristics data such as motor current, the inner pressure of the pump, and vibration on the outside wall of the pump is used.

(b) Next, in Step S32, the Mahalanobis space is set based on the reference time series data. More specifically, the inverse matrix of the correlation matrix derived from the reference time series data set of the motor current, the inner pressure of the pump, and the vibration at the outside wall of the pump is found. The calculation of the inverse matrix of the correlation matrix is performed by the central processing unit of a computer connected to the semiconductor manufacturing equipment. The calculated Mahalanobis space is stored in the memory of the computer.

(c) In Step S33, characteristics data for diagnostic time series data, such as motor current, the inner pressure of the pump, and vibration on the outside wall of the pump is then measured for three days.

Figure 10:
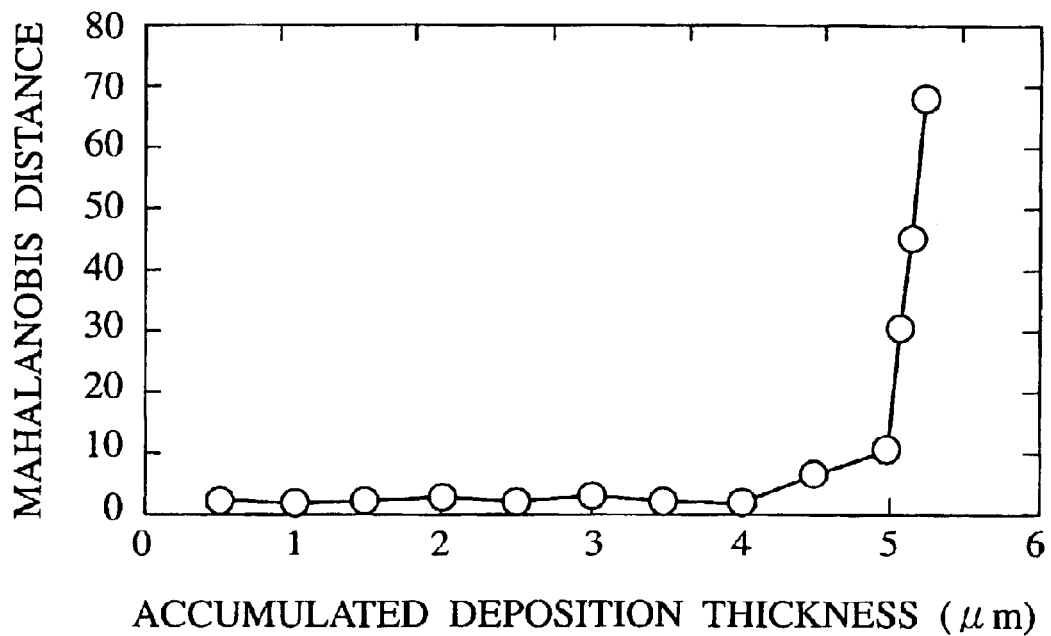
FIG. 10 is a graph showing the accumulated deposition thickness dependency of the MD.

(d) Then, in Step S34, using the diagnostic time series data from the three days and the Mahalanobis space, the MD time variance for the diagnostic time series data is found. Calculation of the MD is performed by the central processing unit of the computer using the Mahalanobis space data stored in the memory of the computer. In this manner, using the characteristics data from three days earlier to evaluate the condition of the dry pump, the effects of the variation process conditions may be eliminated through observation of the variation of behavior in the MD over the three-day period. FIG. 10 is a graph showing the accumulated deposition thickness dependency of a MD. As shown in FIG. 10, it can be understood that the MD exceeds 5 when the accumulated deposition thickness is 4.5 µm. Typically, it is regarded that failure occurs when the MD is 4 or greater, however, as described above, in the present invention, under the empirical rule, a threshold value of the MD is specified to be in a range from 5 to 10. Here, the threshold value of the MD is specified as 5. It may be then determined that an indication of failure is detected when the MD exceeds the threshold value of 5.

(e) Next, in Step S35, a space comprising diagnostic time series data for once the MD reaches the threshold value is fixed as the new Mahalanobis space, i.e. new reference space. Data in the fixed new Mahalanobis space is stored in the memory of the computer.

(f) Then, in Step S36, manufacturing equipment life is determined by comparing the MD relative to the new Mahalanobis space with the threshold value. The calculation of the new MD is executed by the central processing unit of the computer by using data of the new Mahalanobis space stored in the memory of the computer.

In other words, as the value in the reference space is fixed as the value in the new Mahalanobis space (new reference space) and measurement continues, the MD continues to increase, with the MD sharply increasing once the accumulated deposition thickness is approximately 5 µm. The dry pump then halts when the accumulated deposition thickness reaches 5.5 µm.

Figure 11:
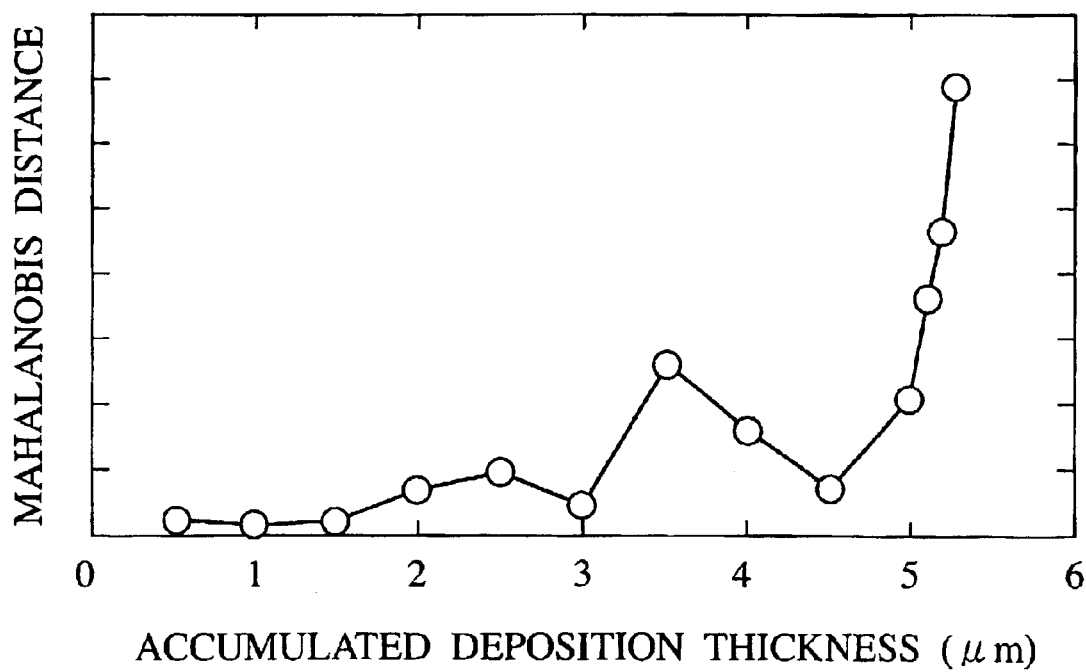
FIG. 11 is a graph showing the accumulated deposition thickness dependence of the MD in a case of utilizing the immediately-after-maintenance dry pump data for the reference space.

FIG. 11 shows the accumulated deposition thickness dependency of the MD in the case of utilizing the immediately-after-maintenance dry pump data in order to form a reference space, in comparison with FIG. 10. In FIG. 11, it is shown that the MD exceeds 5 when the accumulated deposition thickness is approximately 2 µm and conditions change from being normal. The MD tends to increase as a whole, however, a variation between increasing and then reducing again is found for a short period, with the dry pump eventually halting when the accumulated deposition thickness is 5.5 µm. With the accumulated deposition thickness dependency of the MD shown in FIG. 11, the MD tends to increase as the overall accumulated deposition thickness increases. However, unlike in FIG. 10, the variation is not homogeneous, and it may be understood that failure indication is difficult to detect. With the accumulated deposition thickness dependency of the MD shown in FIG. 11, the variation between increase and reduction is found over a short period of time because of the effects of the variation in CVD process conditions. In addition, once the MD exceeds 5, which represents the transition from normal conditions to abnormal conditions, the accumulated deposition thickness is 2 µm, representing a transition to abnormal conditions at an exceedingly faster rate than the case shown in FIG. 10. In FIG. 11, this is because the characteristics data forming the reference space is taken from the immediately-after-maintenance dry pump, and because process variation effects unrelated to failure are deemed as abnormal. In this manner, with the method of forming the reference space shown in FIG. 11, it is difficult to clearly detect the indication of a failure, and it may be understood that it is necessary to allow a wide margin in order to prevent dry pump failure. In other words, when a reference space is formed with immediately-after-maintenance dry pump characteristics data as shown in FIG. 11, it may be understood that efficient device manufacturing is difficult because maintenance must be conducted on the dry pump far in advance of it normally stopping.

In the method of diagnosing manufacturing equipment life according to the third embodiment of the present invention, the "threshold value" for determining the failure indication can be set empirically. Failure indication may be set as being at instances where there is deviation from the average value of between one and three times the standard deviation under normal conditions. However, the way in which the reference space is found is crucial. As shown in FIG. 11, in the case where the reference space is formed using the immediately-after-maintenance dry pump data, the variation of values under normal conditions is great and it is difficult obtain an accurate detection of failure indication. Accordingly, only LPCVD deposition sequence data may be used as the characteristics data for forming the reference space, as shown in FIG. 10. With the method of diagnosing manufacturing equipment life according to the third embodiment, failure indication may be detected at approximately one-tenth the thickness of the accumulated deposition thickness before dry pump failure. Since each parameter increases only in consistent increments after the MD detects the failure indication, it is possible to set the threshold setting for dry pump replacement to be immediately before failure. Therefore, semiconductor device manufacturing may be made more efficient. By converting the threshold value to an accumulated thickness, it is possible to set the threshold value to 0.1 $\mu$m before normal thickness of dry pump failure.

In the third embodiment, an example where a data set comprising motor current, pressure within the pump, and vibration on the outside wall of the pump is used for the calculation of the MD is described, however, a data set comprising an optimal combination including motor power and gas temperature may be used depending on measurement conditions. The interval for measuring time series data required for the calculation of the MD may be determined in accordance with the process conditions. For example, with a typical LPCVD process accompanying semiconductor device manufacturing, appropriate time series data measurement intervals may range from 0.5 seconds to 10 minutes.

(Other Embodiments)

The present invention has been described through the first through third embodiments as mentioned above, however the descriptions and drawings that constitute a portion of this disclosure should not be perceived as limiting this invention. Various alternative embodiments and operational techniques will become clear to persons skilled in the art from this disclosure.

In the description of the first through third embodiments that has been described, an example of the LPCVD for the $Si_3N_4$ film is described, however, it is similarly applicable to the LPCVD for the thin film with other materials such as silicon dioxide ($SiO_2$), phosphosilicate glass (PSG), and polycrystalline silicon. In addition, an example where a single homogeneous thin film is grown is shown, however, similar effects may be obtained in the case of forming a composite film having a plurality of layers, such as a $Si_3N_4$ layer, TEOS oxide layer, and polycrystalline silicon layer with the same LPCVD equipment. Furthermore, an example where the dry pump halts when the accumulated deposition thickness reaches 5.5 $\mu$m is shown, however, the accumulated deposition thickness that the dry pump halts, may vary depending on an LPCVD equipment and process conditions for the LPCVD equipment.

In this manner, the present invention naturally includes various embodiments not specifically mentioned herein. Accordingly, the technical scope of the present invention may be limited only by the inventive features set forth by the scope of the patent claims deemed reasonable from the above description. Various modifications will become possible for those skilled in the art after receiving the teachings of the present disclosure without departing from the scope thereof.

What is claimed is:

1. A method for diagnosing life of manufacturing equipment having a rotary machine, comprising:

measuring reference time series data representing characteristics in a state before deterioration of the manufacturing equipment occurs;

finding a reference auto covariance function based on the reference time series data;

extracting a reference variation caused by variations of the process condition and power supply from the reference auto covariance function, and calculating a cycle of the reference variation;

measuring diagnostic time series data representing the characteristics in a sequence to be measured of the manufacturing equipment;

finding a diagnostic auto covariance function based on the diagnostic time series data; and determining the life of the manufacturing equipment from the diagnostic auto covariance function using a component with a cycle shorter than a cycle of the reference variation.

2. The method of claim 1, wherein the characteristics include at least one of a motor current, a motor power, a pressure, a vibration, and a gas temperature in relation to the rotary machine of the manufacturing equipment.

3. The method of claim 1, wherein the manufacturing equipment is semiconductor manufacturing equipment.

4. The method of claim 3, wherein the characteristics include at least one of a motor current, a motor power, a pressure, a vibration, and a gas temperature in relation to the semiconductor manufacturing equipment.

5. The method of claim 4, wherein the characteristics are associated with behavior of a dry pump serving as the rotary machine used in the semiconductor manufacturing equipment.

6. The method of claim 3, wherein the semiconductor manufacturing equipment is LPCVD equipment.

7. The method of claim 6, wherein the characteristics include at least one of a motor current, a motor power, a pressure, a vibration, and a gas temperature in relation to a dry pump serving as the rotary machine used in the LPCVD equipment.

8. The method of claim 6, wherein the reference time series data is measured immediately after maintenance operation on a dry pump serving as the rotary machine used in the LPCVD equipment.

9. The method of claim 6, wherein the sequence to be measured is a deposition sequence using the LPCVD equipment.

10. The method of claim 6, wherein the diagnostic time series data for the characteristics is measured at intervals of between 0.5 seconds and 10 minutes.

11. The method of claim 6, wherein the characteristics include a motor current of a dry pump serving as the rotary machine used in the LPCVD equipment.

12. The method of claim 6, wherein the characteristics include a frequency distribution of casing vibration of a dry pump serving as the rotary machine used in the LPCVD equipment.

13. A method for diagnosing life of manufacturing equipment having a rotary machine, comprising:

measuring reference time series data before starting measurement of diagnostic time series data for characteristics of the manufacturing equipment;

setting a Mahalanobis space from the reference time series data;

measuring the diagnostic time series data;

calculating a time variation of a Mahalanobis distance of the diagnostic time series data by using the diagnostic time series data and the Mahalanobis space;

setting a new Mahalanobis space from the diagnostic time series data when the Mahalanobis distance reaches a threshold value; and determining the life of the manufacturing equipment by comparing a new Mahalanobis distance corresponding to the new Mahalanobis space with the threshold value.

14. The method of claim 13, wherein the characteristics include at least one of a motor current, a motor power, a pressure, a vibration, and a gas temperature relating to a rotary machine of the manufacturing equipment.

15. The method of claim 13, wherein the manufacturing equipment is semiconductor manufacturing equipment.

16. The method of claim 15, wherein the characteristics include one of a motor current, a motor power, a pressure, a vibration, and a gas temperature relating to the semiconductor manufacturing equipment.

17. The method of claim 16, wherein the characteristics are associated with behavior of a dry pump serving as the rotary machine used in the semiconductor manufacturing equipment.

18. The method of claim 15, wherein the semiconductor manufacturing equipment is LPCVD equipment.

19. The method of claim 18, wherein the characteristics include at least one of a motor current, a motor power, a pressure, a vibration, and a gas temperature in relation to a dry pump serving as the rotary machine used in the LPCVD equipment.

20. The method of claim 18, wherein a deposition sequence has the same process condition as the diagnosis.

21. The method of claim 18, wherein the predetermined threshold value for the Mahalanobis distance falls within a range of 5 through 10.

22. The method of claim 18, wherein the diagnostic time series data for the characteristics is measured at intervals of between 0.5 seconds and 10 minutes.

23. The method of claim 18, wherein the Mahalanobis space is formed by a group of characteristics of a motor current, an inner pressure of a pump, and a vibration on a casing of a dry pump serving as the rotary machine used in the LPCVD equipment.

* * * * *